United States Patent [19]

Caulfield

[11] Patent Number: 5,056,039
[45] Date of Patent: Oct. 8, 1991

[54] HOLOGRAPHIC INTERCONNECT SYSTEM

[75] Inventor: H. John Caulfield, Cornersville, Tenn.

[73] Assignee: University of Alabama in Huntsville, Huntsville, Ala.

[21] Appl. No.: 219,614

[22] Filed: Jul. 14, 1988

[51] Int. Cl.[5] ............................................. G06F 15/18
[52] U.S. Cl. .................................... 364/513; 364/822
[58] Field of Search ............... 364/513, 807, 820, 822, 364/845, 841; 365/125

[56] References Cited

U.S. PATENT DOCUMENTS

| 4,569,033 | 2/1986 | Collins et al. | 364/845 |
| 4,603,398 | 7/1986 | Bocker et al. | 364/845 |
| 4,607,344 | 8/1986 | Athale et al. | 364/822 |
| 4,620,293 | 10/1986 | Schlunt et al. | 364/845 |
| 4,804,250 | 2/1989 | Johnson | 364/822 |

FOREIGN PATENT DOCUMENTS 2176281 12/1986 United Kingdom ................ 364/822

OTHER PUBLICATIONS

Optical Neural Computers; Abu-Mostafa et al.; pp. 88–95.
Multilayer Optical Learning Networks; Wagner et al; SPIE vol. 752 Digital Optical Computing (1987); pp. 86–97.
Learning in Optical Neural Computers; Psaltis et al; IEEE Inter. Conf. on Neural Networks 6-24-1987; pp. 549–555.
Optical Neural Nets Implemented with volume Holograms; Psaltis et al; Topical Meeting on Optical Computing; Summary of Papers Presented; Technical Digest Series v. 11; Optical Soc. of America; 1987; pp. 129–132.

Primary Examiner—Allen R. MacDonald
Attorney, Agent, or Firm—McDermott, Will & Emery

[57] ABSTRACT

A system to produce interconnections between a planar input array and a planar output array using a holographic planar array made by a single exposure or multiple exposures of a photosensitive medium incorporated therein at each of M×N positions in said holographic planar array to store the weighted interconnections to connect each input of the O×P input array to any one or any combination of outputs in the R×s output array in parallel with the strength of connection for each output being determined by the weighting factors as stored in said holographic planar array unadjusted or as adjusted by one or more modulating devices incorporated therein when the optically aligned system is illuminated from any one or any combination of V×W sources each of which produces a beam of electromagnetic radiation singular in time or any combination of such V×W sources in parallel with each such source producing a different wavelength or any combination of such V×W sources producing the same wavelength of electromagnetic radiation and any one or any combination of the positions of the O×P input array are connected to either an electrical signal source or to an optical signal source.

50 Claims, 11 Drawing Sheets

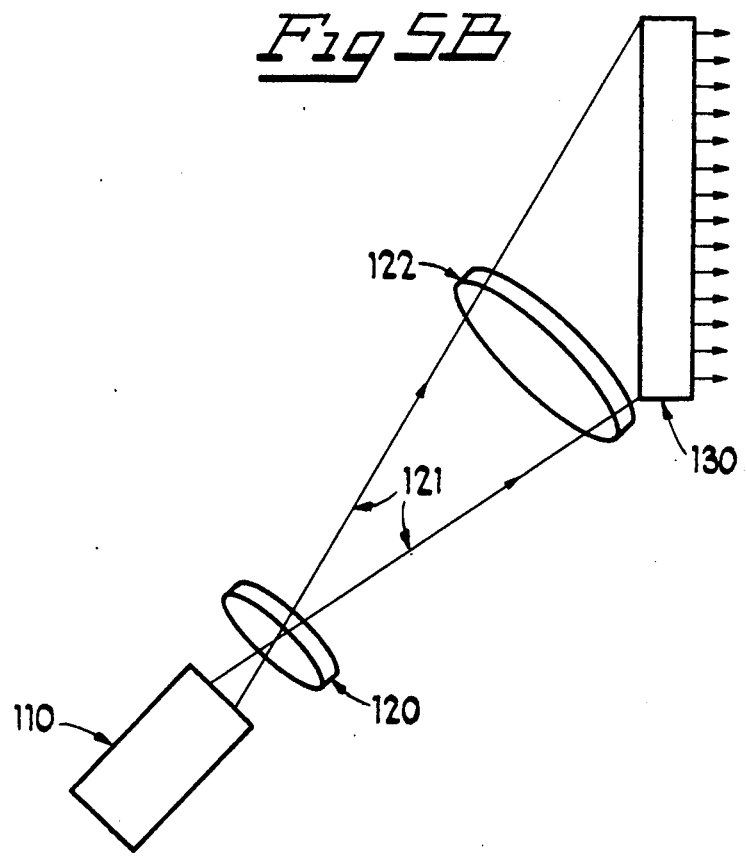
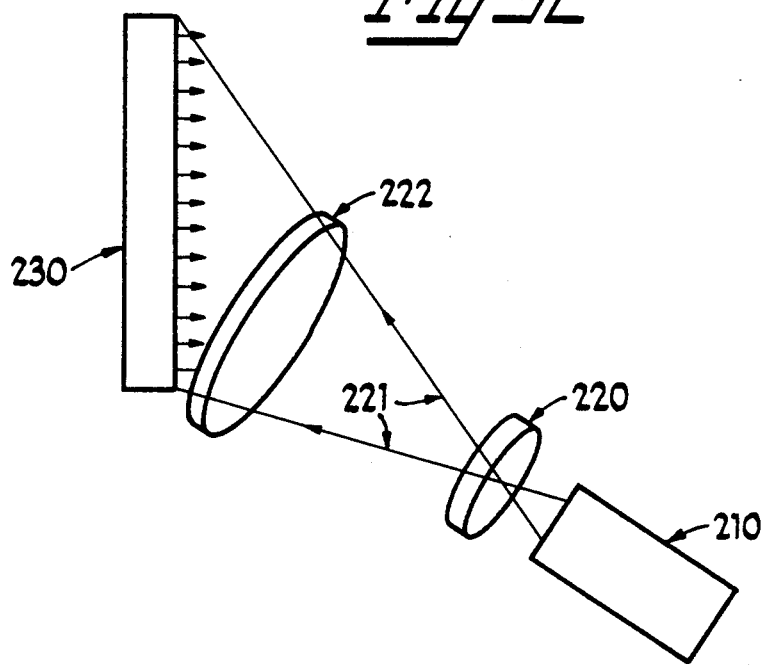

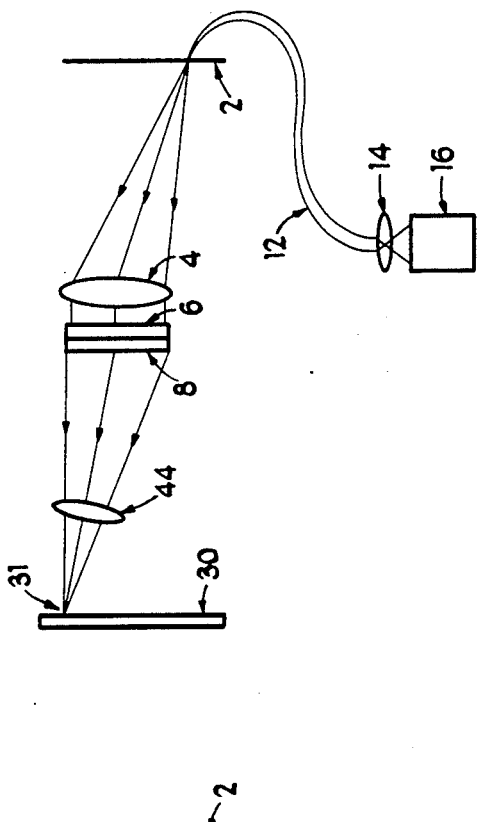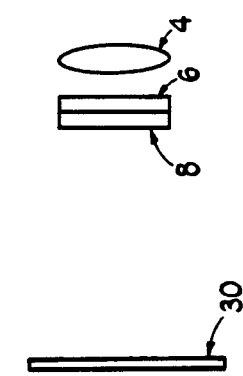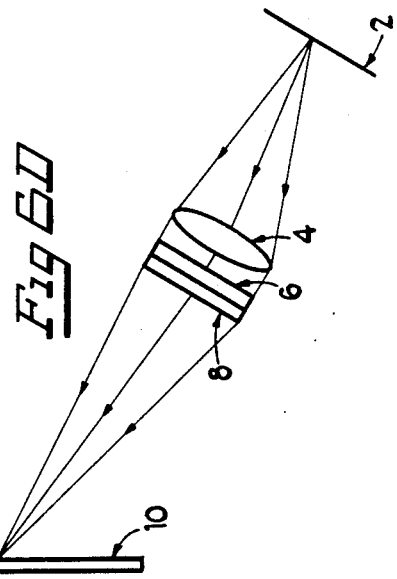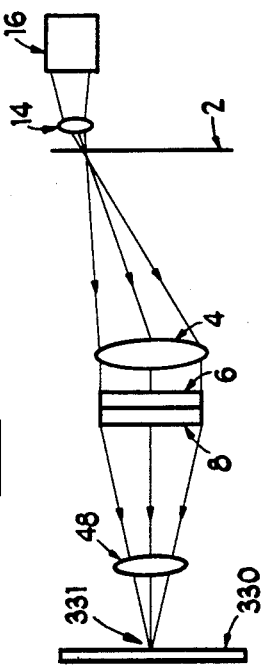

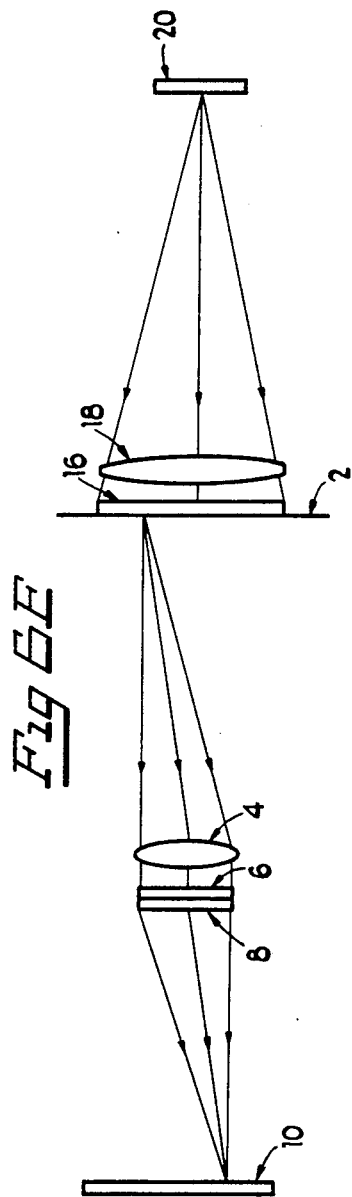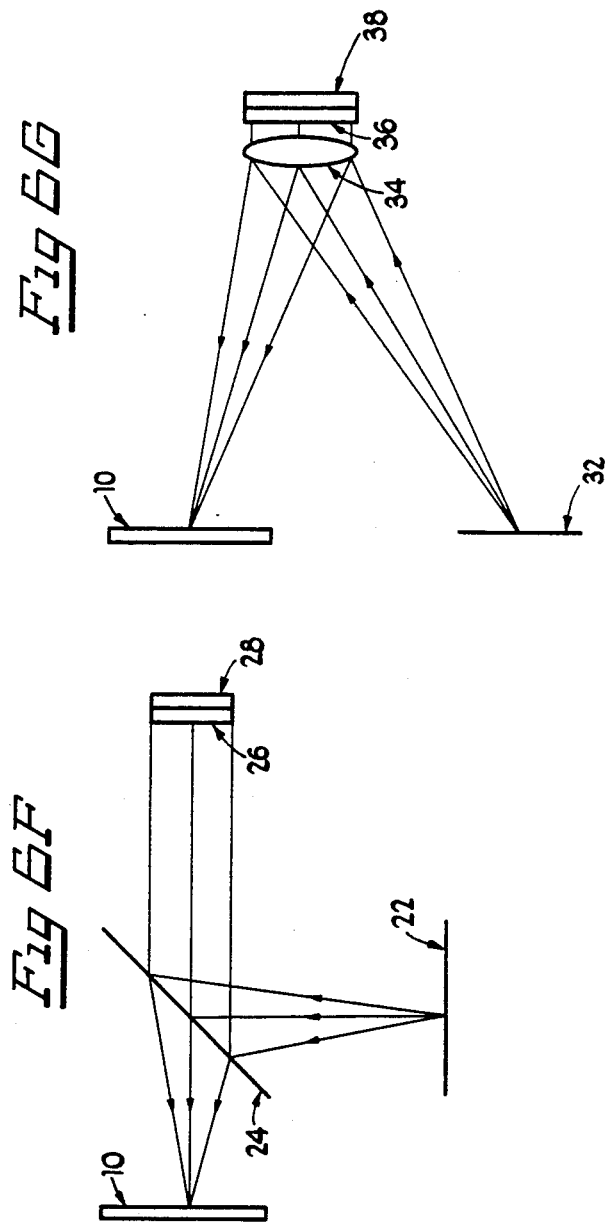

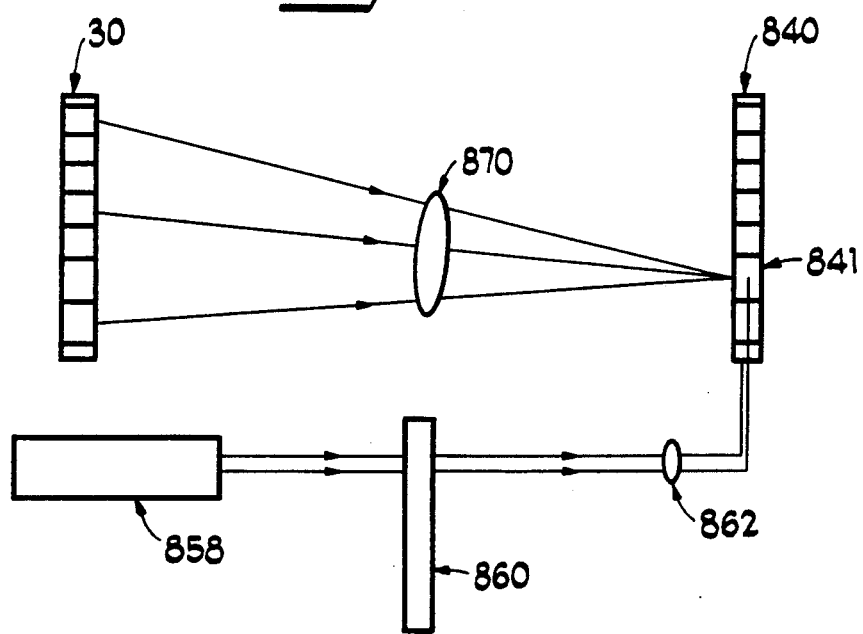
_Fig 7A_
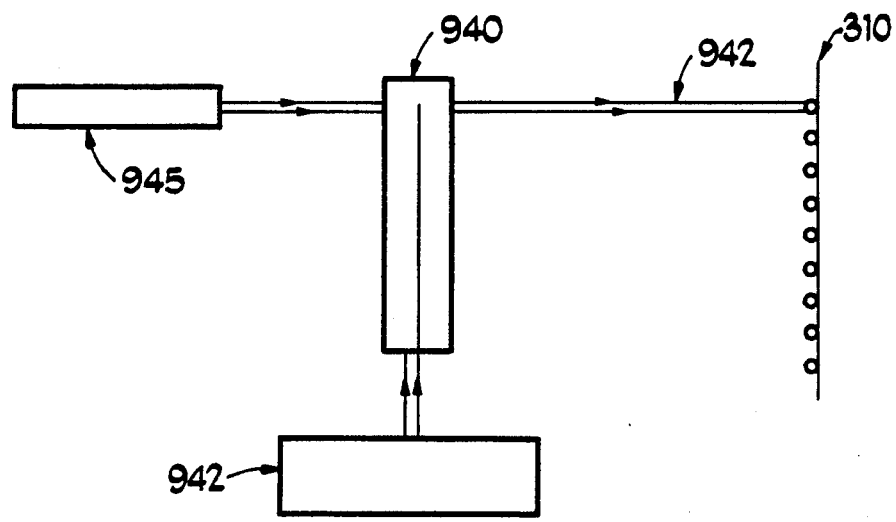
_Fig 7B_

HOLOGRAPHIC INTERCONNECT SYSTEM

STATEMENT OF GOVERNMENT INTEREST

The invention described herein may be manufactured and used by or for the Government for government purposes without the payment of any royalty thereon.

BACKGROUND OF THE INVENTION

The invention relates generally to an interconnect system, and, more particularly, to a system in which a planar input array is optically interconnected to a planar output array using a holographic planar array to effect such interconnections.

In the field of computing, the need for ever faster and faster computers is a continuing requirement. Conventional computers have a single processor acting on meticulously programmed instructions. Tasks are broken down into small segments and performed in sequence very rapidly. This process places severe limitations on the application of such computers to many tasks including those involving vision, speech recognition and complex multi-variable problems. Efforts to remove such limitations through increased speed of operation of single processor computers have met with some success but are now approaching the limitations of electronics technology due to the interaction between electron carrying conductors ever present in electronic systems.

In recent years, computer scientists and engineers have developed system architectures which provide for multi-processors in a computer system. In such a system, the problem to be processed on the computer is divided into logical segments with each segment being assigned to one of the multi-processors in the system and processed in parallel all under the control of a system control processor which performs over all system control, problem segmentation and processor assignments, collecting the results of processing for each segment and performing the processing needed to produce the final solution to the problem. Systems utilizing such architectures are now beginning to be used in limited applications. However, a major problem with such systems is the need to design and program the operating system software required for the efficient operation of such systems. This need is only now beginning to be addressed and it is expected that it will be very costly to produce the required results.

Observations that humans perform task involving vision, speech recognition and complex multi-variable problems with ease have resulted in research into understanding the structure and operation of the human brain. Currently, it is generally believed that the human brain has billions of neurons, each of which is loosely or tightly connected to thousands of other neurons, all functioning in parallel and in concert. It is believed that the power of the brain results from the sheer number of neurons, their multiple interconnections and the parallel processing capabilities.

Scientists attempted to build brain like computers in the 1950's and 1960's, but due to severe technology limitations at that time, most efforts were abandoned and attention focused on conventional artificial intelligence or expert systems. This involved extensive rule programming of computers performing tasks such as reading, diagnostic and other human-like activities. Expert systems are based on heuristic rules that mimic the collective thinking of human experts and are usually implemented on electronic computers. Expert systems have had many successes, but to date they have had considerable problems with the tasks involving vision, speech recognition and complex variable problems. This has led to renewed interests in brain-like computers. In recent years, a great deal of research has been and is today being conducted in pursuit of such brain-like computers, often referred to as "neural network systems".

To date, the recent work in neural network systems has been directed to simulations of such networks by programming digital computers and investigations of the application of either electronics or optics technologies to the design of such systems. Unfortunately, the programming of digital computers to simulate neural networks is, for all but very simple tasks, expensive and, to date, limited effectiveness. The application of electronics technology to produce such neural networks is expected to advance the field over that which can be expected from the simulation approach, but inherently has the limitation of interaction between electron carrying conductors. Optics technology, due to the natuural characteristics that independent light particles do not interact with one another, does not have such limitations.

Recent research on neural networks has shown that even with a small number (hundreds) of neurons, these systems can be taught to perform very rudimentary tasks well beyond those that can be performed in current electronic digital computers. To apply neural network systems to problems of the complexity present in government, industry, business organizations, the number of neurons in the system must be increased substantially resulting in a requirement for massive interconnections between such neurons. The inherent limitations of electronics currently appears to restrict its use in providing such massive interconnections, but the holographic optical system of this invention provides an innovative solution.

SUMMARY OF THE INVENTION

The instant invention overcomes the problems encountered in the past by providing an interconnect system made to produce interconnections between a plurality of imputs in a planar input array and a plurality of outputs in a planar output array using a holographic planar array. In the system the number of interconnections between the said planar input array and the said planar output array is limited only by the number of inputs into the system and the number of outputs from the system.

The said holographic planar array may be made by a single exposure or multiple exposure of a photosensitive medium incorporated therein at each of $M \times N$ positions in such holographic planar array. At each such position of said holographic array is stored the weighted interconnections to connect any one or any combination of inputs in an $O \times P$ planar input array to any one or any combination of outputs in an $R \times S$ planar output array in parallel. The strength of connection of each such input to each of such outputs is determined by the weighting factors as stored in such position of said holographic planar array unadjusted or as adjusted by one or more modulating devices incorporated therein in said system. Such system can be configured with said holographic planar array operating in either transmission or reflection. The element at each position of said $M \times N$ holographic planar array is made by a holographic technique utilizing a photosensitive medium having a high diffraction efficiency as well as a broad bandwidth of operation. In addition, the photosensitive medium must be capable of high resolution in order to record the high density of optical fringes necessary for practical operation.

In fabricating either the transmissive or reflective holographic planar array of such system, each position of said M×N holographic planar array is simultaneously illuminated by temporally and spatially coherent beams of electromagnetic radiation, the number of which is equal to the number of outputs to which said position in such holographic planar array is to be concurrently connected to in normal system operation, with each such beam being generated by a source of such radiation located at the position of each such output in the R×S planar output array and directed to such position of said holographic planar array along a path which is the same as the path from such output position of the said R×S output array to the said position of such holographic planar array in such system. Each such beam is passed through a focusing or diffusing element and then through a modulator device, such device being located at the same position as said output in such planar output array, which modulates said beam with the desired weight of interconnection of said output of such R×S planar output array with said position of such holographic planar array in such system. Concurrently, said position in such holographic planar array is illuminated by another beam of electromagnetic radiation, which beam is the phase conjugate (ray-for-ray reversal) of the beam of electromagnetic radiation to be used to illuminate said position in such holographic planar array during normal operation of such system. If such other beam is mutually coherent with the modulated beams from the said modulators, the desired weighted interconnections for each such concurrently connected position in such R×S planar output array is recorded in the said position of such holographic planar array. This recording process is repeated for each position of such holographic planar array and when completed a master of the desired transmissive or reflective holographic planar array has been fabricated.

In fabricating the holographic interconnect system of this invention, a planar input array of O×P sources of electromagnetic radiation is optically aligned with said holographic planar array. Each set of the aligned positions for the said O×P planar input array and the said M×N holographic planar array are to be illuminated from a source of electromagnetic radiation capable of generating a beam of such radiation which is the phase conjugate (ray-for-ray reversal) of such other beam of electromagnetic radiation used for recording said aligned position of such holographic planar array during the fabrication of such holographic planar array. In turn, said R×S planar output array is optically aligned with the said M×N holographic planar array either with or without modulator devices incorporated therein between said holographic planar array and said planar output array. Each set of aligned positions of said planar output array and said holographic planar array are aligned so that such sets are in the same relative position as were the positions of the said modulators used in recording each position of said holographic planar array during the fabrication of such holographic planar array.

In use the holographic interconnect system of this invention is connected to any number of sources of input signals with or without transducers as needed to activate a planar array of V×W point sources of electromagnetic radiation having the characteristics specified to match the requirements needed for the reliable operation of said holographic planar arrays incorporated in such system. Such planar array of such sources of radiation illuminate each position of said M×N holographic planar array either singularly in time or any combination of such positions in parallel. The readout of each position of said holographic planar array is imaged on any one or any combination of the positions in said R×S output array as determined by the weighted interconnections stored in said holographic planar array unadjusted or as adjusted by one or more modulating devices incorporated therein. Each position of said R×S output array functions as either a detector, a nonlinear electromagnetic beam operator, or a point source of electromagnetic radiation for input to a second such holographic interconnect system.

It is therefore an objective of this invention to provide an interconnect system which is capable of connecting a plurality of input signals with a plurality of outputs using a holographic array.

It is another objective of this invention to provide a holographic interconnect system which is capable of connecting a planar input array of signal sources and a planar output array using a holographic planar array to store weighted interconnections to make such connections.

It is another objective of this invention to provide a holographic interconnect system in which the number of interconnections between such planar input array and such planar output array made in parallel is limited only to the number determined by multiplying the number of signal sources in such planar input array and the number of output positions in such planar output array.

It is a further object of this invention to provide a holographic interconnect system in which the strength of connection of each signal source in such planar input array to any one or to any combination of positions in such planar output array is determined by the weighted interconnections stored in said holographic planar array unadjusted or as adjusted by one or more modulating devices incorporated therein.

It is still another objective of this invention to provide a holographic interconnect system which is capable of continuous operation in making parallel interconnections between any one or any combination of inputs into such planar input array and any one or any combination of positions in such planar output array.

For a better understanding of the present invention, together with other and further objects thereof, reference is made to the following detailed description of the invention taken in conjunction with the accompanying drawings and the appended claims.

DETAILED DESCRIPTION OF THE DRAWINGS

FIG. 5A through 5G are schematic representations of techniques for producing alternate embodiments for the electromagnetic illumination of the holographic array for the holographic interconnect system of this invention;

FIG. 6A through 6K are schematic representations of techniques for producing the alternate embodiments of the holographic array for the holographic interconnect system of this invention;

FIG. 7A and 7B are schematic representations of the techniques for producing the alternate embodiments of the planar input array for the holographic interconnect system of this invention.

DETAILED DESCRIPTION OF THE PREFERRED EMBODIMENTS

The present invention generally provides a neural system for optically interconnecting an $N \times N$ input signal array to an $N \times N$ output array through an $N^4$ weighted interconnect. Mathematically, if the matrix A represents the $N \times N$ input array components $a_{kl}$ and similarly the matrix B represents the $N \times N$ output array components $b_{ij}$, the interconnection by a 4-D tensor T, provides:

$$B = TA. \qquad (1)$$

Equivalently, $$b_{ij} = \sum_k \sum_l T_{ijkl} a_{kl}. \qquad (2)$$

Generally speaking, there are four broad types of systems or embodiments for using the inventions. These four types are (1) a passive transmissive embodiment, (2) an active transmissive embodiment, (3) a passive reflective embodiment, and (4) an active reflective embodiment. Each of these general embodiments can be used in different arrangements or with different elements as specifically described below. The specific use or embodiment of the invention will dictate the manner in which the interconnect or holographic array is recorded.

In order to fully understand the embodiments of this invention, it is first necessary to describe the technique for producing the holographic interconnect system of this invention. Since the invention has a number of alternate embodiments, FIGS. 1, 5A, 6B, 6H, 7A and 8A will be referred to for illustrating the fabrication procedure or technique of producing a passive transmissive embodiment of the holographic interconnect system of this invention.

FIGS. 2, 5D, 6C, 6J, 7B and 8B will be referred to for illustrating the fabrication procedure or technique of producing the active transmissive embodiment of the holographic interconnect system of this invention.

FIGS. 3, 5C, 6E and 6I will be referred to for illustrating the technique of producing a passive reflective embodiment of the holographic interconnect system of this invention.

FIGS. 4, 5F, 6C and 6K will be referred to for illustrating an active reflective embodiment of the holographic interconnect system of this invention.

It should be noted, however, that even though the holographic interconnect system of this invention have a number of different embodiments, the techniques for producing and using each of the holographic interconnect systems are similar.

Figure 5A:
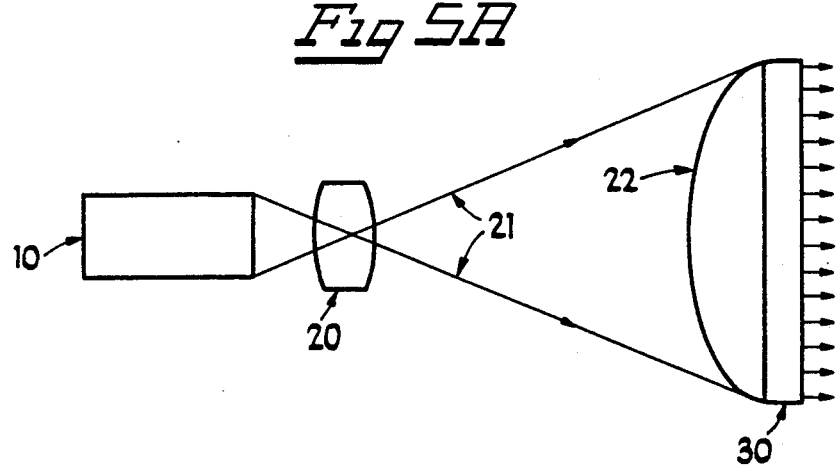

Reference is now made to FIGS. 1, 5A, 6B, 6H, 7A and 8A of the drawings in order to fully describe one of the techniques which may be utilized to produce a passive transmissive embodiment of the holographic interconnect system of this invention. A conventional source of temporally and spatially coherent, monochromatic electromagnetic radiation 10 depicted in FIG. 5A is collimated or otherwise shaped by lens 20 depicted in FIG. 5A to produce a reference wavefront 21 depicted in FIGS. 1 and 5A. This reference wavefront 21 illuminates all $M \times N$ positions of the holographic planar array 30 depicted in FIGS. 1, 5A and 6B described more fully in detail hereinbelow. Beams of the reference wavefront 21 are diffracted through each $M \times N$ position of the holographic planar array 30 and are modulated by the weighting values stored therein for the strength of electromagnetic radiation which is to be directed along the paths from each such $M \times N$ position in the holographic planar array 30 to each of the $O \times P$ positions in the planar input array 40 depicted in FIGS. 1, and 7A described more fully in detail hereinbelow. The weighting values and such paths are determined by the weighted interconnection pattern previously recorded in each position of the holographic planar array 30 using the technique depicted in FIGS. 6B and 6H described more fully in detail hereinbelow. The electromagnetic radiation beams received at each position of the $O \times P$ planar input array 40 in FIG. 1 which are concurrently imaged from each position of the holographic planar array 30 are summed and modulated by the pattern of input signals from signal sources connected to the planar input array 40 depicted in FIG. 7A described more fully in detail hereinbelow. The modulated beams from each position of the planar input array 40 are directed along paths as determined by the weighted interconnection patterns previously recorded in the holographic planar array 30 to each of the $R \times S$ positions in the planar output array 50 depicted in FIGS. 1 and 8A described more fully in detail hereinbelow. The modulated beams received at each position of the planar output array 50 which are concurrently imaged from each of the $O \times P$ positions of the planar input array 40 are detected and transformed into electrical signals by suitable known means such as transducer devices located at each such $R \times S$ positions of the planar output array 50. The output of such transducer devices are connected to external apparatuses to provide control signals for such apparatuses.

Reference is now made to FIG. 5A for the purpose of describing a technique for providing the electromagnetic illumination of the holographic array of the passive transmissive embodiment of the holographic interconnect system of this invention. A conventional source of temporally and spatially coherent, monochromatic electromagnetic radiation 10, such as a laser capable of operating in the infrared range or any other desired range of electromagnetic radiation, is used to produce reference wavefront 21, which is collimated or otherwise shaped by lens 20 and 22. Reference wavefront 21, which is phase conjugate (ray-for-ray reversal) of the reference wavefront used in recording the transmissive holographic array 30 in FIG. 6H described more fully hereinbelow, concurrently illuminates all M×N positions of such holographic array 30 and is diffracted by the hologram previously recorded at each such M×N position.

Figure 6I:
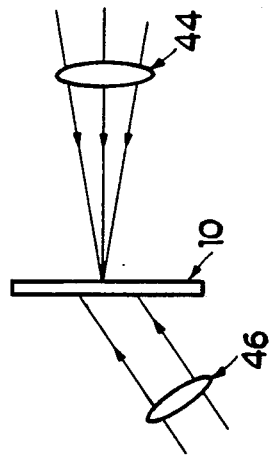
Figure 6K:
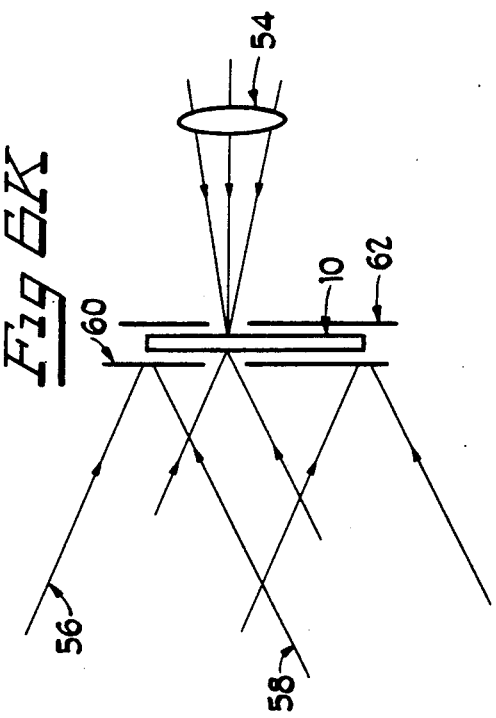
Figure 6H:
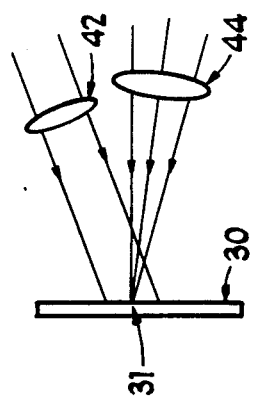

Reference is now made to FIGS. 6A, 6B and 6H of the drawings in order to describe one technique which may be utilized to produce the holographic array for use in the passive transmissive embodiment of the holographic interconnect system of this invention. Through the use of an apparatus, the basic components of which are represented in FIG. 6A master recordings of holograms needed in the holographic interconnect system of this invention can be fabricated. Locus 2 is a plane at the same relative position of the output array in FIG. 1. A modulator device array 8, such as a spatial light modulator, is used to modulate beams of electromagnetic radiation. The spatial light modulator (SLM) may be electronically, optically or otherwise addressable. A phase plate 6 may be used adjacent the modulation 8 to improve the quality of the recorded hologram. A lens 4 images beams from the locus 2 through the phase plate 6 upon the O×P positions on the modulator device array 8. The lens 4 may be split so that one-half of the lens is on each side of the SLM 8 (and phase plate 6, if used). The resulting, modulated beams are imaged onto the recording medium 30 which becomes the holographic array. The recording medium is a high resolution photosensitive surface such as dichromatical gelatin, photographic emulsion, read/write thermoplastic, photoresist, photorefractives, etc. The SLM encodes the desired spatial pattern or interconnect weight on the recording medium which becomes the hologram array.

Figure 1:
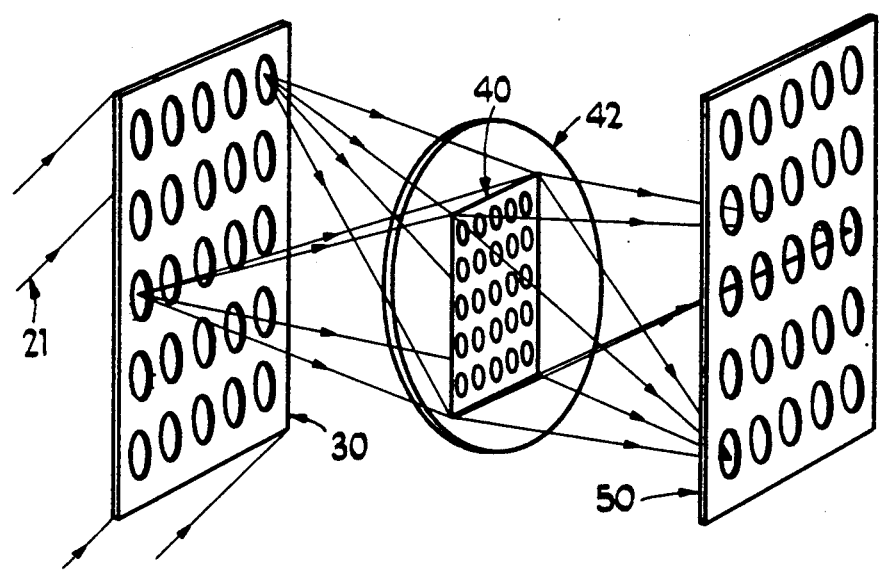
FIG. 1 is a schematic representation of a technique for producing the passive transmissive holographic interconnect system of this invention.
Figure 6J:
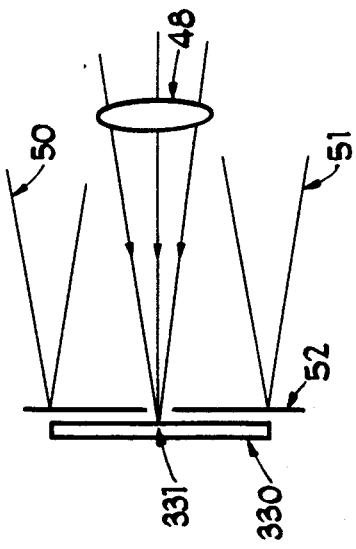

In FIG. 6B, a conventional electromagnetic radiation source 16 produced a beam focused or otherwise conditioned by lens 14 onto a fiber optics cable and transmitted to a point of a source position locus 2 in FIGS. 6A and 6B which is positioned at the same relative location as the output array 50 is to the O×P planar input array 40 and the M×N planar holographic array 30 in FIG. 1. The resulting beams of such electromagnetic radiation are imaged upon an O×P modulator device array 8 by a lens 4 through an optional phase plate 6 in FIG. 6B. Said O×P modulator device array 8, positioned at the same relative position as the O×P input array 40 in FIG. 1, modulates the beams of electromagnetic radiation concurrently imaged upon each position of O×P modulator device array 8 from said radiation source located on said position locus 2 in FIG. 6B with the weighting values for the desired strength of connection for each input of the O×P input array 40 to each output of the R×S output array 50 in FIG. 1. The modulated beams of electromagnetic radiation from the O×P modulator device array 8 form an object beam 44 which are imaged, directly or through a lens (not shown) upon a selected position 31 of a M×N position holographic array 30 in FIGS. 6B and 6H each position of which incorporates therein a photosensitive medium. A second beam of electromagnetic radiation 42 in FIG. 6H which is phase conjugate (ray-for-ray reversal) of the referenced wavefront 21 in FIG. 1 and mutually coherent with the object beam of electromagnetic radiation from the said modulator device array 8 is caused to be concurrently incident on the selected position 31 of said M×N position array 30 in FIG. 6B to effect the recording of a hologram containing the desired weighted interconnections between each input of the input array 40 and each output of the output array 50 in FIG. 1. A physical barrier or mask 52 as shown in FIG. 6J may be positioned in front of the M×N holographic array 30 in order to block any electromagnetic radiation not directed at the selected position 31 in FIG. 6H of said M×N holographic array 30. The process is repeated in a step by step manner for the recording of the desired hologram in each position of said M×N position holographic array, a master copy of the holographic planar array 30 in FIG. 1 has been produced. The next step in the process is to produce one or more copies of such master using conventional copying procedures. Each such copy of said master is then available to be assembled into an operating passive transmissive embodiment of the holographic interconnect system of this invention.

Reference is now made to FIG. 7A of the drawings in order to fully describe one technique which may be utilized to produce the O×P input array 40 in FIG. 1 of a passive transmissive embodiment of the holographic interconnect system of this invention. An O×P position modulator device array such as an electrically addressed spatial light modulator (SLM) 840, which is positioned as an O×P input array 40 in FIG. 1, has each input position 841 electrically connected to one of O×P input signal sources 860 from external apparatuses 858. The connected input signals 862 to the said O×P modulator device array 840 modulate the beams of electromagnetic radiation 870 which are concurrently imaged on each position of said O×P modulator device array 840 from each position of a M×N position holographic planar array 30 in FIG. 1.

Figure 8A:
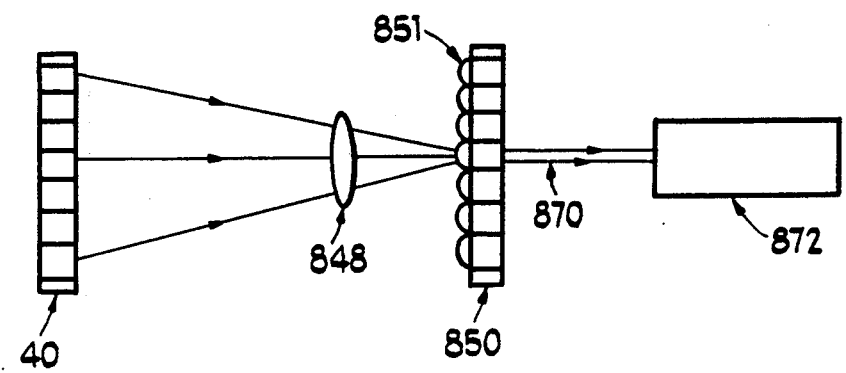
FIG. 8a and 8B are schematic representations of the techniques for producing the alternate embodiments of the planar output array for the holographic interconnect system of this invention.

Reference is now made to FIG. 8A in order to fully describe one technique which may be utilized to produce an R×S position output array of a passive transmissive embodiment of a holographic interconnect system of this invention. An array of photoelectric devices 850 are spatially arranged and positioned to serve as an R×S output array 50 in FIG. 1. Each such photoelectric device 851 is illuminated by the beams of electromagnetic radiation 848 from an input array 40 in FIG. 1 and transforms such beams into an electrical signal 870 which are then connected to external apparatuses 872 to provide control signals to such external apparatuses.

Reference is now made to FIGS. 2, 5D, 6C, 6J, 7B and 8B of the drawings in order to fully describe one of the techniques which may be utilized to produce an active transmissive embodiment of the holographic interconnect system of this invention. An array of sources 310 each of which produces, singularly in time or any combination of O×P sources in parallel as determined by an array of O×P input signals 940 in FIG. 7B described more fully hereinbelow, temporally and spatially coherent, monochromatic beams of electromagnetic radiation. Such beams can be of the same wavelength for all said sources or any number of wavelengths up to and including a different wavelength for each source. The beam of such radiation from each of said sources is collimated or otherwise shaped by lens 320 in FIG. 5D to produce a reference wavefront 321 in FIG. 5D for each of M×N positions of the holographic array 330 in FIG. 5D. Beams of the reference wavefront 321 are diffracted through each position of the holographic planar array 330 in FIG. 2, and are modulated by the weighting values for the strength of electromagnetic radiation which is to be directed along the paths from each such position in the holographic planar array 330 to each of the R×S positions in the planar output array 350 in FIGS. 2 and 8B described more fully hereinbelow. Such weighting values and such paths are determined by the weighted interconnection pattern previously recorded in each position of the holographic planar array 330 using the technique depicted in FIGS. 6C and 6J described more fully hereinbelow. The electromagnetic radiation beams received at each position of the $R \times S$ positions output array 350 in FIGS. 2, 5D and 8B from each position of the holographic planar array 330 are detected and focused onto fiber optics cables 352 for transmission to external apparatus 354 in FIG. 8B.

Figure 5D:
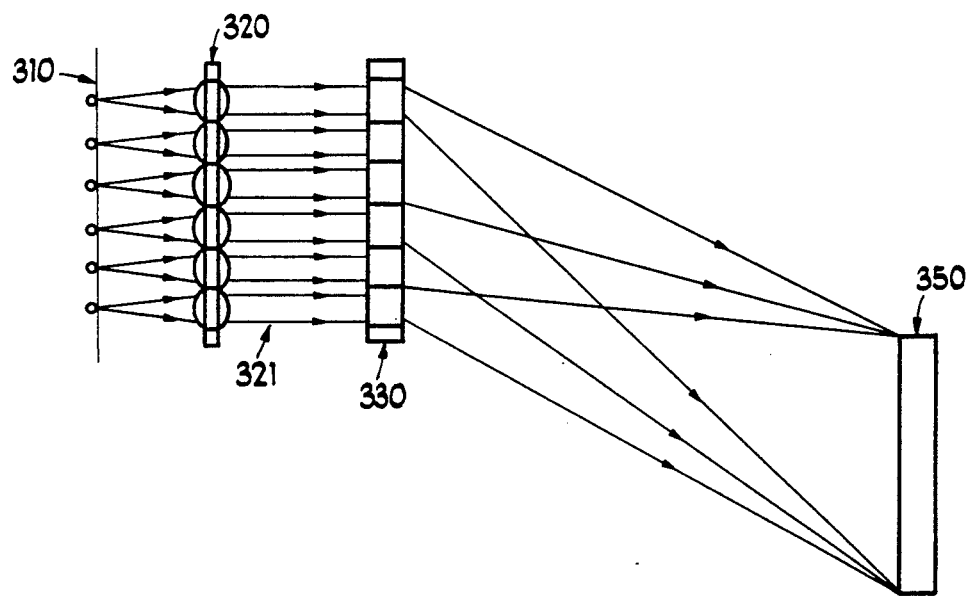
Figure 5E:
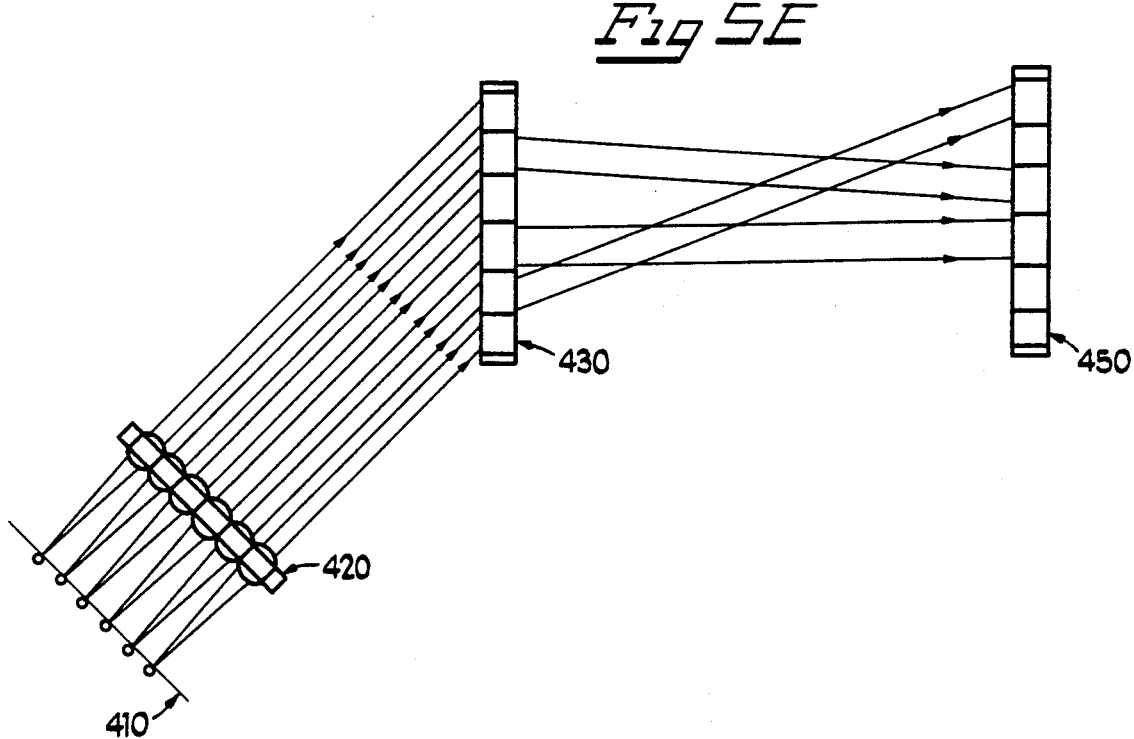

Reference is now made to FIG. 5D for the purpose of describing a technique for providing the electromagnetic illumination of the holographic array of the active transmissive embodiment of the holographic interconnect system of this invention. An array of sources 310 each of which produces, singularly in time or any combination of $V \times W$ sources in parallel as determined by an array of $O \times P$ input signals 940 in FIG. 7B described more fully hereinbelow, temporally and spatially coherent, monochromatic beams of electromagnetic radiation. Such beams can be of the same wavelength for all said sources or any number of wavelengths up to and including a different wavelength for each source. The beam of such radiation from each of said sources is collimated or otherwise shaped by lens 320 in FIG. 5D to produce a reference wavefront 321 in FIG. 5D for each of $M \times N$ positions of the holographic array 330 in FIG. 5D. The beam from each source in the reference wavefront 321 is phase conjugate (ray-for-ray reversal) of each reference wavefront used in recording the hologram in each position in the transmissive holographic array 330 in FIG. 6J described more fully hereinbelow. Each source in the array 310 is activated by an input signal from an $O \times P$ array of input signals 940 generated by external apparatus 945 in FIG. 7B described more fully hereinbelow.

Reference is now made to FIGS. 6A, 6C and 6J of the drawings in order to describe one technique which may be utilized to produce a holographic array for the passive transmissive embodiment of the holographic interconnect system of this invention. Through the use of an apparatus, the basic components of which are represented in FIG. 6A described above, master recordings of holograms needed in the holographic interconnect system of this invention can be fabricated. In FIG. 6C, a conventional electromagnetic radiation source 16 produces a beam focused or otherwise conditioned by lens 14 to form a point source on a source position locus 2 in FIGS. 6A and 6C. The resulting beams of such electromagnetic radiation are imaged upon an $O \times P$ modulator device array 8 by lens 4 through phase plate 6 in FIG. 6C. Said $O \times P$ modulator device array 8, positioned at the same relative location as the output array 350 is to the $M \times N$ planar holographic array 330 in FIG. 2, modulates the beams of electromagnetic radiation concurrently imaged upon each position of $O \times P$ modulator device array 8 from said radiation source located on said position locus 2 in FIG. 6C with the weighting values for the desired strength of connection for each input of the $O \times P$ input array 940 in FIG. 7B to each output of the $R \times S$ output array 350 in FIG. 2. The modulated beams of electromagnetic radiation from the $O \times P$ modulator device array 8 form an object beam 48 which is imaged, directly or through a lens, upon a selected position 331 of a $M \times N$ position holographic array 330 in FIGS. 6C and 6J each position of which incorporates therein a photosensitive medium. A second beam of electromagnetic radiation 50 or 51 in FIG. 6J, which is phase conjugate (ray-for-ray reversal) of the beam in the referenced wavefront 321 in FIG. 5D which is to be used to illuminate position 331 in FIGS. 6C and 6J, and mutually coherent with the object beam of electromagnetic radiation from the said modulator device array 8, is caused to be concurrently incident on the selected position 331 of said $M \times N$ position holographic array 330 to effect the recording of a hologram containing the desired weighted interconnections between each input of the $O \times P$ input array 940 in FIGS. 7B and 10, and each output of the output array 350 in FIGS. 2 and 5D. A physical barrier or mask 52 in FIG. 6J may be positioned in front of the $M \times N$ holographic array 330 in order to block any electromagnetic radiation not directed at the selected position 331 of said $M \times N$ holographic array 330. The process is repeated in a step by step manner for the recording of the desired hologram in each position of said $M \times N$ position holographic array. Upon completion of such recording of the desired hologram in each position of said $M \times N$ positions holographic array, a master copy of the holographic planar array 330 in FIG. 2 has been produced. The next step in the process is to produce one or more copies of such master using conventional copying procedures. Each such copy of such master is then available to be assembled into an operating active transmissive embodiment of the holographic interconnect system of this invention.

Figure 2:
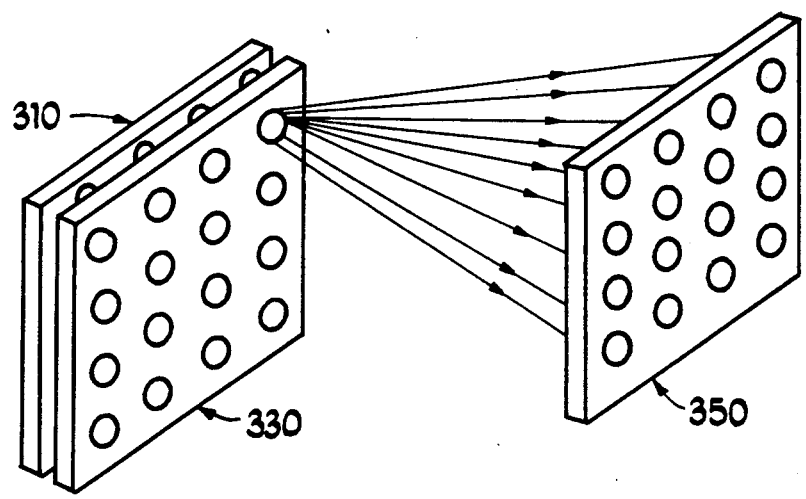
FIG. 2 is a schematic representation of another technique for producing the active transmissive holographic interconnect system of this invention.

Reference is now made to FIG. 7B of the drawings in order to fully describe one technique which may be utilized to produce the $O \times P$ input array 310 in FIG. 2 of an active transmissive embodiment of the holographic interconnect system of this invention. An $O \times P$ position array of sources of electromagnetic radiation such as lasers 310 in FIGS. 5D and 7B are activated by input signals 942 from an input signal array 940 in FIG. 7B generated from external apparatus 945 in FIG. 7B electrically connected to such input signal array 940. Said input signal array 940 is also electrically connected to a means of address selection 962 of each of the $O \times P$ positions of said signal input array 940 in order to control the time sequence for activation and wavelength selection of said sources 310 in FIGS. 5D and 7B.

Figure 8B:
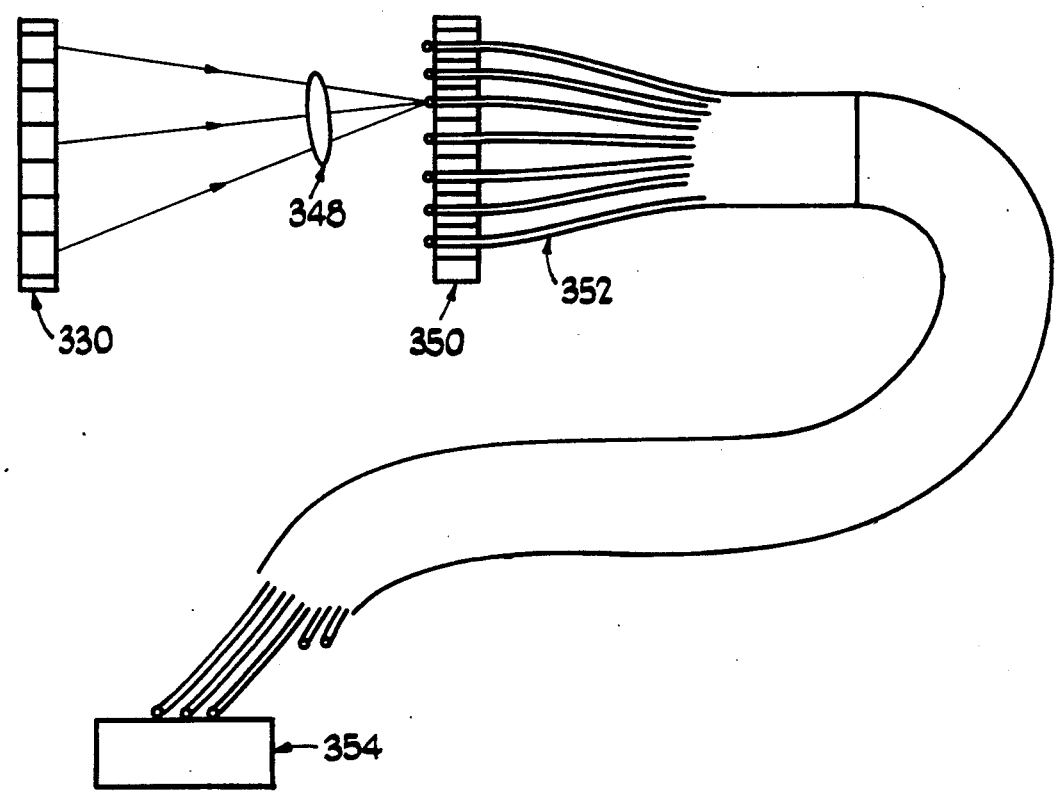

Reference is now made to FIG. 8B in order to fully describe one technique which may be utilized to produce an $R \times s$ position output array of an active transmissive embodiment of a holographic interconnect system of this invention. An array of optical fibers 352 are spatially arranged and positioned to serve as an $R \times S$ position output array 350 in FIG. 2. The optical fibers in each of the $R \times S$ positions of the output array 350 are illuminated, directly or through focusing lens, by the beams of electromagnetic radiation 348 from an $M \times N$ holographic array 330 in FIG. 2. Such beams are then transmitted through the said optical fibers to external apparatuses 354 in FIG. 8B. One such external apparatus may be another holographic interconnect system of this invention, in which case, the outputs from the $R \times S$ output array 350 in FIG. 8B serve as an array of sources of electromagnetic radiation 310 in FIGS. 5D, 5E, 5F and 5G for such other holographic interconnect systems.

Reference is now made to FIG. 3, 5C, 6E and 6I of the drawings in order to fully describe one of the techniques which may be used to produce a passive reflective embodiment of the holographic interconnect system of this invention. The significant difference of this embodiment of the holographic interconnect system and the embodiment described above in reference to FIG. 1 of the drawings is the use of a reflective holographic array 230 in FIG. 3 instead of a transmissive holographic array 30 in FIG. 1. Such a reflective holographic array 230 is produced using an apparatus a depicted in FIGS. 6A, 6E and 6I more fully described hereinbelow. In operation of the passive reflective embodiment, a conventional source of temporally and spatially coherent, monochromatic electromagnetic radiation 210, which is phase conjugate (ray-for-ray reversal) of the reference wavefront 46 in FIG. 6I used to record the holograms in the M×N holographic array 230, is positioned to illuminate through lens 220 the M×N position holographic array 230 with a reference wavefront 221 in FIGS. 3 and 5C directed along a path which is off normal incidence to the plane of such holographic array 230 and on the same side of such holographic array 230 as the diffracted read-out beams of such holographic array 230 in FIGS. 3 and 5C. In all other respects, the techniques used to produce the passive reflective embodiment of this invention are the same as those used to produce the passive transmissive embodiment described above in reference to FIG. 1. In operation, the passive reflective embodiment in FIG. 3 and the passive transmissive embodiment in FIG. 1 are essentially the same and produce equivalent performance results.

Figure 3:
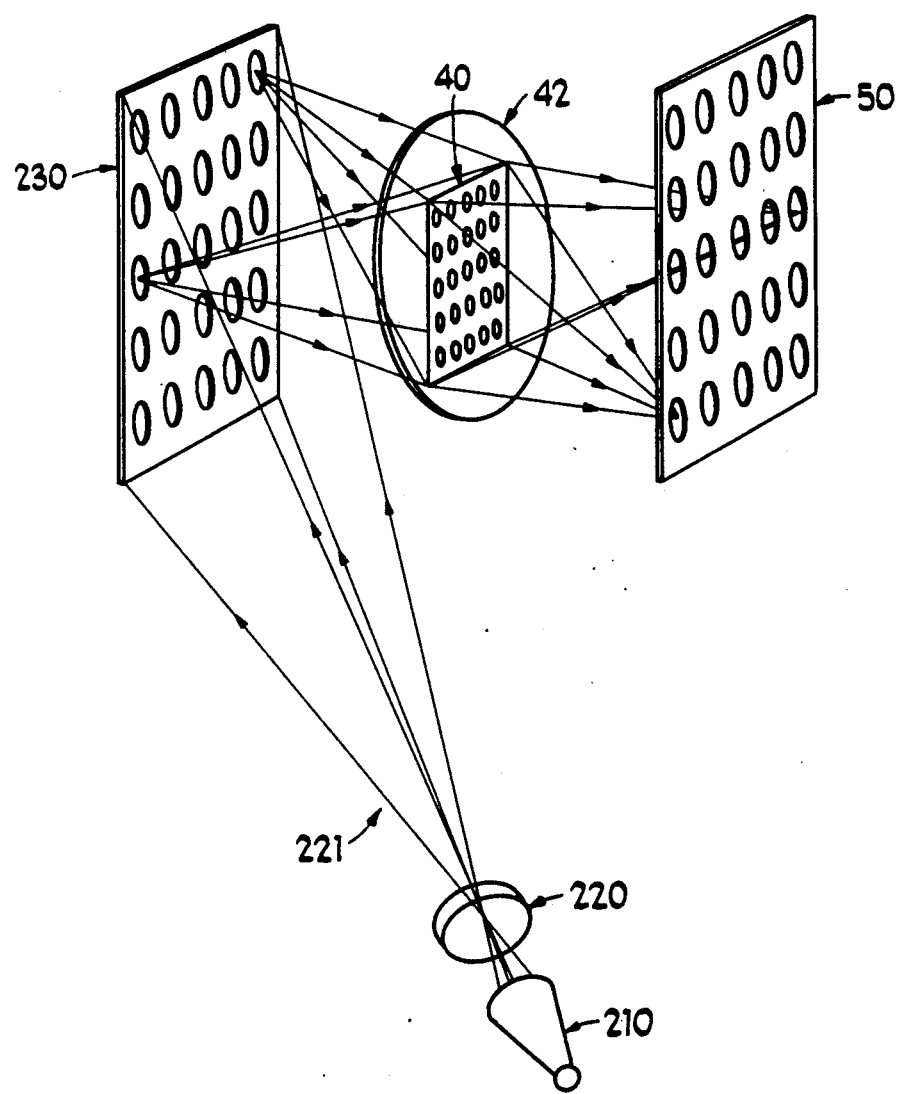
FIG. 3 is a schematic representation of a technique for producing an embodiment of the passive reflective holographic interconnect system of this invention.

Reference is now made to FIGS. 6A, 6E and 6I of the drawings in order to fully describe one of the techniques which may be used to produce a passive reflective holographic array 230 in FIGS. 3 and 5C. A conventional source of temporally and spatially coherent, monochromatic electromagnetic radiation 20 is collimated or otherwise shaped by lens 18 to illuminate a spatial light modulator (SLM) 17 in FIG. 6E which is located on the source position locus 2 in FIGS. 6A and 6E and spatially configured to provide a position located the same as each position of a M×N position output array in FIG. 3. Such SLM is electronically (or optically) addressed to select each position one at a time for M×N steps to establish the interconnect paths required to interconnect each input of the O×P position input array 40 to each output of the R×S position output array 50 in FIG. 3. As each position of such SLM is selected the beams of radiation from source 20 at such position illuminate the SLM 8 through lens 4 and phase plate 6. Such SLM 8 in FIG. 6E modulates such beams of radiation with the desired weighting values for the strength of interconnection of each input in the O×P input array 40 and each output position in the R×S position output array 50 in FIG. 3. The modulated beams are directed to a selected position 231 in the M×N holographic array 230 in FIGS. 3, 6E and 6I as the object beam 44. A second beam of electromagnetic radiation 46 in FIG. 6I, which is phase conjugate (ray-for-ray reversal) of the reference wavefront 221 in FIG. 3 and mutually coherent with the object beams 44, is caused to be concurrently incident on the selected position 231 of said M×N position holographic array 230 in FIGS. 3, 6E and 6I to effect the recording of a hologram containing the desired weighted interconnection between each input of the input array 40 and each output of the output array 50 in FIG. 3. A physical barrier 52 as in FIG. 6J may be positioned in front of the M×N holographic array 230 in order to block any electromagnetic radiation not directed at the selected position 231 of said M×N holographic array 230. The process is repeated in a step by step manner for the recording of the desired hologram in each position of said M×N position holographic array. Upon completion of such recording of the desired hologram in each position of said M×N position holographic array, a master copy of the holographic planar array 230 in FIG. 3 has been produced. The next step in the process is to produce one or more copies of such master using conventional copying procedures. Each such copy of said master is then available to be assembled into an operating passive reflective embodiment of the holographic interconnect system of this invention.

Figure 4:
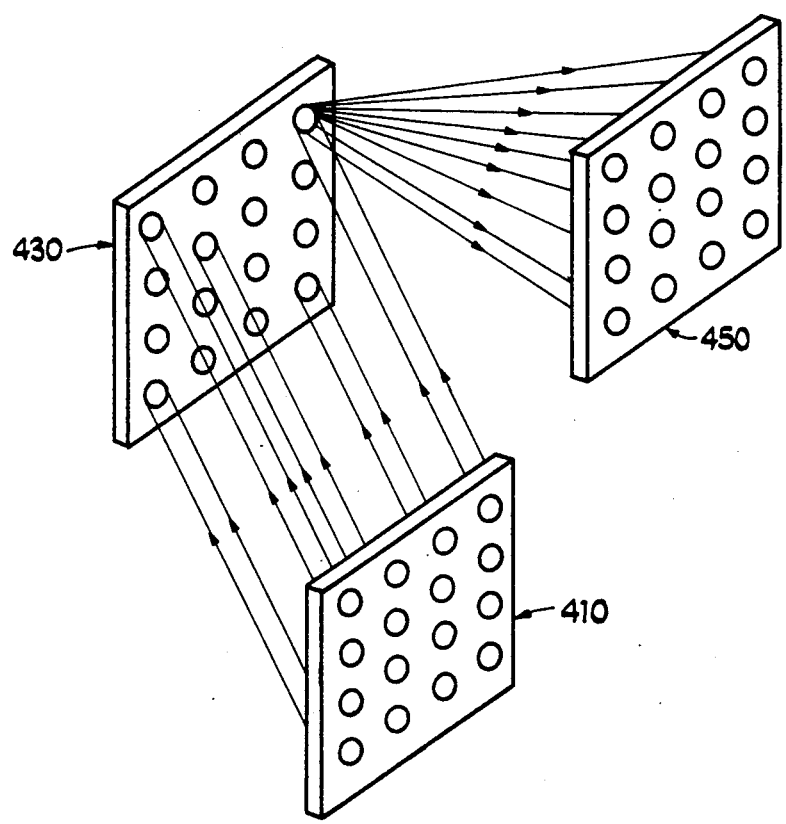
FIG. 4 is a schematic representation of a technique for producing an embodiment of the active reflective holographic interconnect system of this invention.
Figure 5F:
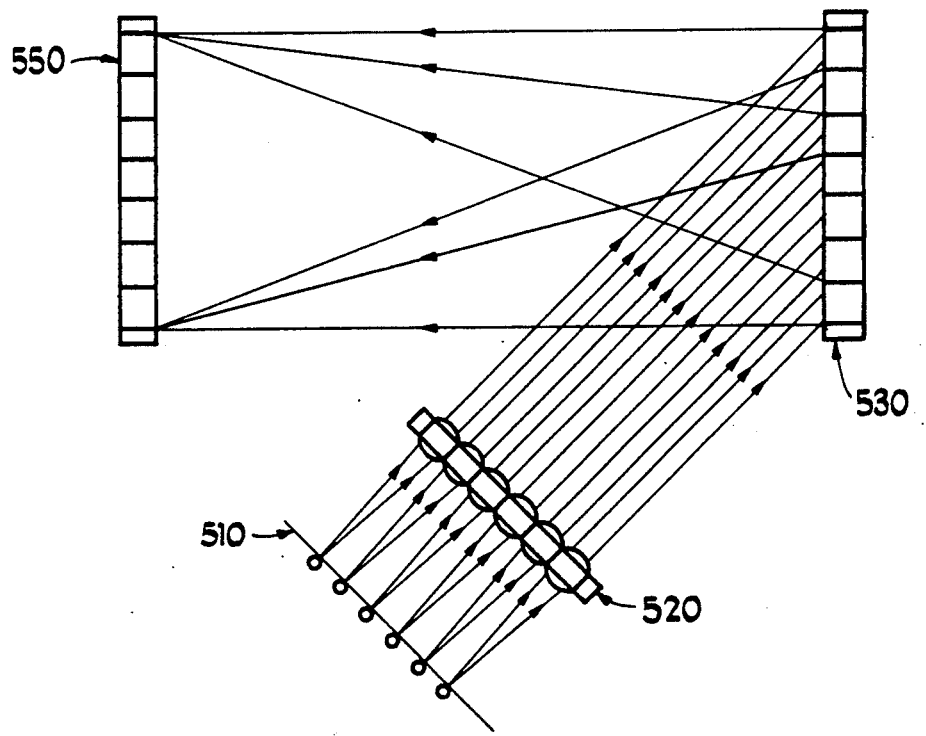

Reference is now made to FIGS. 4, 5F, 6E, 6K and 7B of the drawings in order to fully describe one of the techniques which may be used to produce an active reflective embodiment of the holographic interconnect system of this invention. The significant difference of this embodiment of the holographic interconnect system and the embodiment described above in reference to FIG. 2 of the drawings is the use of a reflective holographic array 430 in FIG. 4 instead of a transmissive holographic array 330 in FIG. 2. Such a reflective holographic array 430 in FIG. 4 is produced using an apparatus as depicted in FIGS. 6A, 6E and 6K more fully described hereinbelow. In operation of the active reflective embodiment, an array of sources 310 in FIG. 5F is positioned so as to illuminate a M×N position holographic array 430 in FIGS. 4 and 5F from a direction which is off normal incidence to the plane of such holographic array 430 and on the same side of such holographic array as the diffracted read out beams of such holographic array 430. Each such source produces, singularly in time or any combination of O×P sources in parallel as determined by an array of V×W input signals 940 in FIG. 7B described more fully hereinabove, temporally and spatially coherent, monochromatic beams of electromagnetic radiation. Such beams can be of the same wavelength for all said sources or any number of wavelengths up to and including a different wavelength for each source. The beam of such radiation from each said source is collimated or otherwise shaped by lens 520 in FIG. 5F to produce a reference wavefront 521 in FIG. 5F for each of M×N positions of the holographic array 430 in FIG. 5F which is phase conjugate (ray-for-ray reversal) of the reference wavefront 56 or 58 in FIG. 6K used to record the holograms in the M×N holographic array 430. Beams of the reference wavefront 521 are diffracted and reflected by the hologram in each position of the holographic array 430 in FIGS. 4 and 5F, and are modulated by the weighting values for the strength of electromagnetic radiation which is to be directed along the paths from each such position in the M×N holographic array 430 to each of the R×S positions in the planar output array 450 in FIGS. 4 and 5F. Such weighting values and such paths are determined by the weighted interconnection pattern previously recorded in each position of the holographic planar array 430 using the technique depicted in FIGS. 6E and 6K described more fully hereinbelow. In all other respects, the techniques used to produce the active reflective embodiment of this invention are the same as those used to produce the active transmissive embodiment described above in reference to FIG. 2. In operation, the active reflective embodiment in FIG. 4 and the active transmissive embodiment in FIG. 2 are essentially the same and produce equivalent performance results.

Reference is now made to FIGS. 6A, 6E, 6K and 7B of the drawings in order to fully describe one of the techniques which may be used to produce an active reflective holographic array 430 in FIGS. 4 and 5F. The use of the hologram recording apparatus in FIGS. 6A and 6E for generating the object beam for recording the holograms at each position of a M×N holographic array 430 in FIG. 4 is identical to that described in reference to FIG. 3 hereinabove and is incorporated here by reference. A second beam of electromagnetic radiation 56 in FIG. 6K, which is phase conjugate (ray-for-ray reversal) of the reference wavefront 521 in FIG. 5F for each source in the input source array 510 and mutually coherent with the object beams 54, is caused to be concurrently incident on the selected position 231 of said M×N position holographic array 430 in FIGS. 4 and 6K to effect the recording of a hologram containing the desired weighted interconnection between each input of the input array 940 in FIG. 7B, more fully described hereinabove, and each output of the output array 450 in FIGS. 4 and 5F. Physical barrier 60 and 62 in FIG. 6K may be positioned on either side of the M×N holographic array 430 in order to block any electromagnetic radiation not directed at the selected position 231 of said M×N holographic array 430. The process is repeated in a step by step manner for the recording of the desired hologram in each position of said M×N position holographic array. If desired, this recording procedure can be repeated one or more times to record more than one hologram in each position of said M×N position holographic array with a source of a different wavelength, for example, to permit, in use, different, selective weighing by the use of one of a range of multiple wavelength sources. Upon completion of such recording of the desired hologram in each position of said M×N positions holographic array, a master copy of the holographic planar array 430 in FIG. 4 has been produced. The next step in the process is to produce one or more copies of such master using conventional copying procedures. Each such copy of said master is then available to be assembled into an operating passive reflective embodiment of the holographic interconnect system of this invention.

Many modifications of the interconnect system of the present invention are contemplated and may be used in the actual practice of the invention. For example, for a large spatial light modulators and/or large holographic arrays, a certain amount of modularity may be desirable. For example, each of these arrays could easily be divided into 10 or 100 or more sections for ease in manufacture and then assembled, for example, by a gird-like structure to form a single planar array. The spatial light modulator could be utilized in a system at several points so that the input signals could be initially modulated by a first spatial light modulator prior to additional weighting by the interconnect means. Similarly, a plurality of interconnect systems can be connected in series or cascaded and feedback or feedforward signals utilized to modify the addressing to the previous or subsequent spatial light modulator. Also, in a single interconnect system, a plurality of holographic arrays could be preprogramed and interchangeably moved into their operative position by conventional means. For example, pie-shaped or segment-shaped holograhic arrays could be automatically rotated into and out of position. Also, as with the reflective mode in FIG. 5G which utilizes a beam splitter, multiple beam splitters or multiple holographic arrays could be utilized to operate only on selected beams depending upon the characteristics of a particular beam of electromagnetic radiation. Similarly, a plurality of holograms could be recorded at each position in the holographic array for selective operation depending upon the wavelength of the light. Each of the discrete modulators could have a uniform phase but in one system each of the modulators could have different phases which may be chosen from some probability distribution function.

Figure 5G:
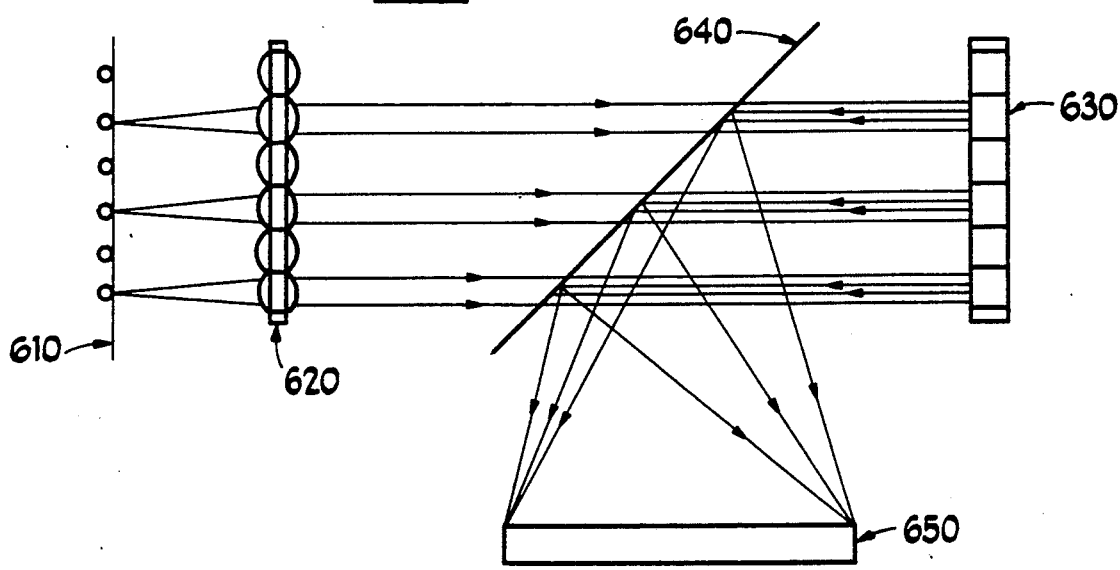

In another variation, the holograms could be angularly multiplexed and the wavefronts corresponding to the different angles replayed sequentially. Similarly, the wavelengths could be multiplexed, or a combination of both the angularity and wavelengths could be multiplexed. In FIG. 5G, the beamsplitter itself may be a polarizing beamsplitter.

In the hologram array itself, the subholograms need not be evenly spaced or may in fact overlap. Also, it is contemplated that various types of lenses may be used throughout the interconnect system to improve the signal. In some cases, a hologram array may be so large that it would be advantageous to demagnify the hologram by relay optics before use in the system. However, Fresnel defraction considerations make it desirable to keep the holograms larger than or equal to approximately one milimeter.

Similarly, optical fibers may be utilized if desired, or as input and output transitions where a desired path may not be a straight line. Also, although I have disclosed in FIGS. 5A though 5G various methods for producing electromagnetic illumination, other variations would be known to those skilled in the art. Similarly, 6A throgh 6K show many techniques for recording planar holographic arrays but other variations and combinations would be obvious to skilled artisans. Likewise, the input array shown in FIG. 7A and 7B as well as the output array shown in 8A and 8B are subject to different, obvious variations.

Therefore, the foregoing detailed description has been given for clearness of understanding only and no unnecessary limitations should be understood therefrom as many modifications are known to those skilled in the art.

What is claimed is:

1. A neural interconnect system, comprising:
   input means for providing a plurality of input signals;
   output means for providing a plurality of output signals; and
   planar holographic array between said input means and said output means for providing a fixed modulation of said input signals in a predetermined manner and selectively transferring each of said plurality of input signals to the output means.

2. The interconnect system of claim 1 wherein the holographic array includes a plurality of individual holograms.

3. The interconnect system of claim 1 including means for modulating said input signals.

4. A neural interconnect system, comprising:
   input means for providing a plurality of input signals;
   output means for providing a plurality of output signals; and
   a holographic array, including a plurality of holograms, between said input means and said output means for providing a fixed modulation of said input signals in a predetermined manner and selectively transferring each of said plurality of input signals to the output means.

5. The interconnect system of claim 1 wherein each of the holograms of the holographic array are encoded to provide a fixed modulation of the input signals in a predetermined manner for transfer to the output means.

6. The interconnect system of claim 5 wherein the predetermined encoding of each hologram weights and transfers the input signal to each of a plurality of positions on the output means.

7. The interconnect system of claim 6 wherein each of the plurality of holograms on the holographic array is encoded so as to receive a plurality of input signals from the input means and transfer a modulated signal to each position on the output means for providing a plurality of output signals.

8. The interconnect system of claim 7 wherein said input means is a planar array providing a plurality of input signals.

9. The interconnect system of claim 8 wherein the output means is a planar output array providing a plurality of output signals.

10. The interconnect system of claim 9 wherein the interconnect means comprises a planar holographic array including said plurality of holograms.

11. The interconnect system of claim 10 wherein said interconnect means further includes a source of spatially coherent, monochromatic electromagnetic radiation.

12. The interconnect system of claim 11 wherein a reference beam from said source impinges each hologram of the planar holographic array.

13. The interconnect system of claim 6 including means for modulating said input signal.

14. A parallel $N^4$ weighted optical interconnect system comprising a planar a plurality of holograms for connecting an integer $N \times N$ data input array to an $N \times N$ data output array through an $N^4$ weighted holographic array.

15. The interconnect system of claim 14 including means for modulating said input data.

16. A method of making an $N^4$ weighted holographic array comprising the steps of selecting a recording medium and encoding a plurality of individual holograms, N an integer on the recording medium utilizing a reference beam of coherent, monochromatic, electromagnetic radiation.

17. The method of making the holographic array of claim 16 including focusing said radiation on each said plurality of positions on said holographic array.

18. The method of making the holographic array of claim 17 further including the step of phase orienting the radiation beam for recording.

19. The method of making the holographic array of claim 18 including the step of modulating the radiation beam to create a desired spatial pattern on a specific position of the holographic array.

20. An optical neural system including input means for receiving the input signals, interconnect means comprising a planar holographic array and output means for connection to a plurality of outputs for connecting a plurality of input signals with any one or more of the outputs.

21. The interconnect system of claim 20 wherein the holograhic array includes a plurality of individual holograms.

22. The interconnect system of claim 21 wherein each of the holograms of the holographic array are encoded to provide a fixed modulation of the input signals in a predetermined manner for transfer to the outputs.

23. The interconnect system of claim 22 wherein each of the plurality of holograms on the holographic array is encoded so as to receive a plurality of input signals and transfer a modulated signal to each position on the outputs for providing a plurality of output signals.

24. The interconnect system of claim 23 wherein said interconnect means further includes a source of spatially coherent, monochromatic electromagnetic radiation.

25. The interconnect system of claim 24 wherein a reconstruction beam from said source impinges each hologram of the planar holographic array.

26. An apparatus comprising means for illuminating a modulating array simultaneously with signals derived from a plurality of spatially distinct holograms and focusing means to reimage the modulated signals on an output array.

27. The apparatus of claim 26 including a holographic direction changer, a holographic array, a phase plate array, an addressable reflective spatial light modulator, a beam splitter and an output means for receiving the image of said holograms.

28. The apparatus of claim 26 wherein the modulating array is a spatial light modulator.

29. The apparatus of claim 28 wherein the spatial light modulator acts in a reflection mode.

30. The apparatus of claim 28 wherein the spatial light modulator operates in a transmissive mode.

31. The apparatus of claim 26 wherein the modulating array includes a plurality of discrete, interchangeable spatial light modulators.

32. The apparatus of claim 31 wherein the spatial light modulators are electrically addressable.

33. The apparatus of claim 31 wherein the spatial light modulators are optically addressable.

34. The apparatus of claim 26 including a phase mask adjacent said array of modulators.

35. The apparatus of claim 34 wherein each modulator is discrete having a uniform phase and wherein the phases vary between the modulators.

36. The apparatus of claim 35 wherein the phases are chosen as a function of a probability distribution.

37. The apparatus of claim 26 wherein the focusing means a lens adjacent to the modulating array.

38. The apparatus of claim 37 wherein the focusing means is a hologram.

39. The apparatus of claim 38 wherein the holograms comprise a plurality of subholograms.

40. The apparatus of claim 39 wherein the subholograms are angularly multiplexed.

41. The apparatus of claim 40 wherein the subholograms are also wavelength multiplexed.

42. The apparatus of claim 39 wherein the subholograms are wavelength multiplexed.

43. The apparatus of claim 26 wherein the plurality of spatially distinct holograms are selectively replaceable by a similar plurality of spatially distinct holograms.

44. The apparatus of claim 26 wherein the hologram elements overlap.

45. The apparatus of claim 26 the output array includes output means for receiving the image of said holograms.

46. The apparatus of claim 45 wherein said output means is a vidicon.

47. The apparatus of claim 46 including feedback means connected to said modulating regions.

48. The apparatus of claim 46 wherein said output means is a CCD array.

49. The apparatus of claim 48 including an electronic processor for receiving an output signal from the output means and feedback means connected thereto providing signals to the electronically addressable spatial light modulator.

50. The apparatus of claim 45 wherein said output means is an optical by stable device array.

* * * * *